United States Patent
Tokuchi

(10) Patent No.: US 11,059,179 B2
(45) Date of Patent: *Jul. 13, 2021

(54) ROBOT DEVICE AND NON-TRANSITORY COMPUTER READABLE MEDIUM

(71) Applicant: FUJIFILM Business Innovation Corp., Tokyo (JP)

(72) Inventor: Kengo Tokuchi, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 292 days.

This patent is subject to a terminal disclaimer.

(21) Appl. No.: 15/788,868

(22) Filed: Oct. 20, 2017

(65) Prior Publication Data

US 2018/0304471 A1 Oct. 25, 2018

(30) Foreign Application Priority Data

Apr. 19, 2017 (JP) .............................. JP2017-082951

(51) Int. Cl.
*G06F 17/00* (2019.01)
*B25J 11/00* (2006.01)

(52) U.S. Cl.
CPC ........ *B25J 11/0015* (2013.01); *B25J 11/0005* (2013.01)

(58) Field of Classification Search
CPC ...... B25J 11/0015; B25J 11/0005; B25J 9/161
See application file for complete search history.

(56) References Cited

U.S. PATENT DOCUMENTS

| 8,250,206 | B2 | 8/2012 | Horii et al. | |
|---|---|---|---|---|
| 10,019,566 | B1* | 7/2018 | Gallagher | B25J 13/025 |
| 10,333,711 | B2* | 6/2019 | Fleischman | H04L 9/3213 |
| 10,343,283 | B2* | 7/2019 | Pinter | B25J 11/009 |
| 10,449,671 | B2* | 10/2019 | Michalakis | B25J 9/1666 |
| 2012/0150352 | A1* | 6/2012 | Park | B25J 13/006 700/264 |
| 2016/0379121 | A1* | 12/2016 | Ge | B25J 11/0005 706/46 |

FOREIGN PATENT DOCUMENTS

| JP | 7-287695 A | 10/1995 |
|---|---|---|
| JP | 2000-010466 A | 1/2000 |
| JP | 2001-191274 A | 7/2001 |
| JP | 2004-174642 A | 6/2004 |
| JP | 5258020 B2 | 8/2013 |
| JP | 5312257 B2 | 10/2013 |
| JP | 2015-44280 A | 3/2015 |

OTHER PUBLICATIONS

Notice of Reasons for Refusal dated Apr. 6, 2021 from the Japanese Patent Office in JP Application No. 2017-082951.

* cited by examiner

*Primary Examiner* — Harry Y Oh
*Assistant Examiner* — Sohana Tanju Khayer
(74) *Attorney, Agent, or Firm* — Sughrue Mion, PLLC

(57) ABSTRACT

A robot device includes a receiver and a sender. The receiver receives a character in a virtual space. The sender sends authorization to operate the robot device to an apparatus in return for the received character.

20 Claims, 8 Drawing Sheets

FIG. 5

| FREQUENCY | 900 MHz | 2.4 GHz | 5 GHz |
|---|---|---|---|
| MAJOR STANDARD | RFID (UHF BAND) | ZigBee (REGISTERED TRADEMARK) <br> Bluetooth (REGISTERED TRADEMARK) | IEEE802.11a <br> MuLTEfire |
| ADVANTAGES | • HIGH RESISTANCE TO OBSTACLES <br> • FEW INTERFERENCE FREQUENCY BANDS (SUCH AS THAT OF MICROWAVE OVENS) | • HIGH POWER SAVING <br> • HIGH SPEED <br> • SMALL-SIZE ANTENNA | • FEW INTERFERENCE FREQUENCY BANDS (SUCH AS THAT OF MICROWAVE OVENS) <br> • HIGH SPEED |
| DISADVANTAGES | • LARGE-SIZE ANTENNA <br> • SHORT COVERAGE RANGE | • MANY INTERFERENCE FREQUENCY BANDS | • LOW RESISTANCE TO OBSTACLES |

FIG. 6

| COMMUNICATION METHOD | INFRARED COMMUNICATION | VISIBLE LIGHT COMMUNICATION | NEAR FIELD COMMUNICATION (NFC) |
|---|---|---|---|
| ADVANTAGES | • HIGH POWER SAVING <br> • EASY MINIATURIZATION | • VISIBLY EASY TO TRACK COMMUNICATION PATH | • EASY PAIRING |
| DISADVANTAGES | • INFRARED IS INVISIBLE | • STRONG DIRECTIVITY | • LIMITED TO NEAR DISTANCES |

FIG. 7

| No | FUNCTION PROVIDED IN ROBOT DEVICE | OPERATION EXECUTABLE BY USING FUNCTION |
|---|---|---|
| 1 | LIFT OBJECTS WITH ARM PARTS | LIFT AND CARRY OBJECTS UP TO 30 kg |
| 2 | MOVE | MOVABLE BY CHANGING SPEED WITHIN 10 km/h |
| ... | ... | ... |

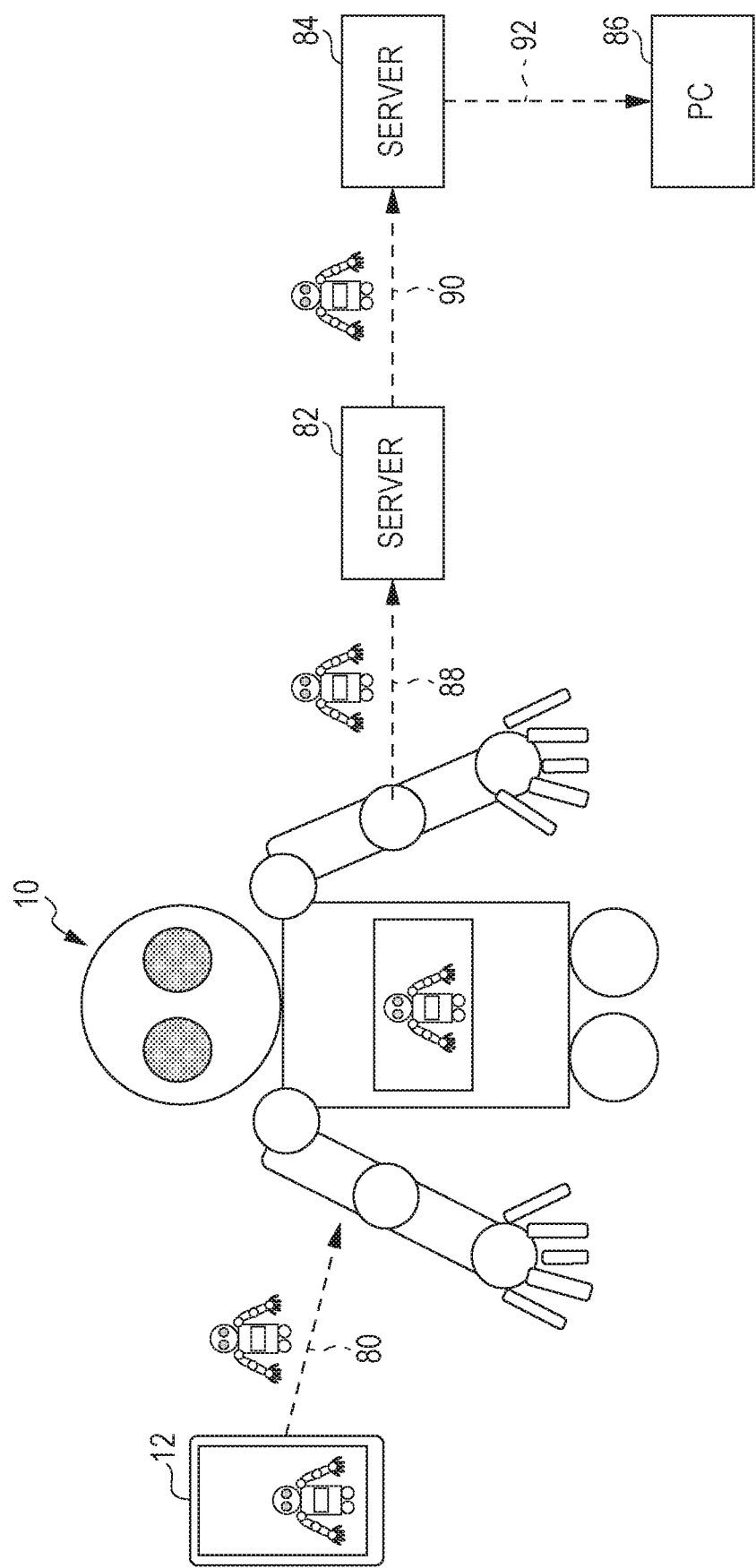

ROBOT DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-082951 filed Apr. 19, 2017.

BACKGROUND

Technical Field

The present invention relates to a robot device and a non-transitory computer readable medium.

SUMMARY

According to an aspect of the invention, there is provided a robot device including a receiver and a sender. The receiver receives a robot character in a virtual space. The sender sends authorization to operate the robot device to an apparatus in return for the received robot character.

BRIEF DESCRIPTION OF THE DRAWINGS

An exemplary embodiment of the present invention will be described in detail based on the following figures, wherein:

FIGS. 5 and 6 illustrate characteristics of wireless communication technologies;

FIG. 7 illustrates a function management table;

FIG. 10 illustrates processing according to a modified example.

DETAILED DESCRIPTION

Figure 1:
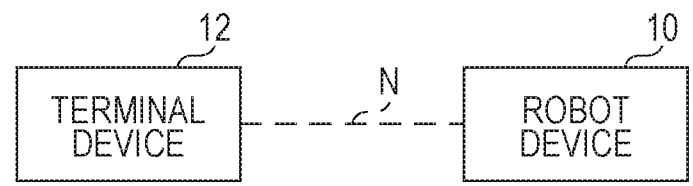
FIG. 1 is a block diagram of an information processing system according to the exemplary embodiment.

An example of an information processing system according to the exemplary embodiment of the invention will be described below with reference to FIG. 1.

The information processing system according to the exemplary embodiment includes a robot device 10 and a terminal device 12. The terminal device 12 serves as an information processing apparatus. The robot device 10 and the terminal device 12 are devices existing in a real space, and may communicate with each other via a communication path N, for example. The configuration of the information processing system shown in FIG. 1 is only an example, and a device other than the robot device 10 and the terminal device 12 may be included in the information processing system. Examples of such a device are a server, a storage device, and a device which executes specific processing, such as an image processing device, an audio processing device, and an image forming device. Such a device may have the function of communicating with the robot device 10 and the terminal device 12.

The robot device 10 has the function of detecting a situation around the robot device 10 and providing information corresponding to the detection result or executing processing in accordance with the detection result or in response to an instruction to execute processing. The robot device 10 may detect the surrounding situation while moving or being still. The robot device 10 may only execute the functions of the robot device 10. Alternatively, the robot device 10 may execute processing by using another device or a user, for example, or may execute processing by collaborative work with another device or a user, for example.

The robot device 10 is operable by a user having authorization to operate the robot device 10 (hereinafter such authorization may also be called "operation authorization"). For example, information indicating operation authorization (operation authorization information) is sent from the robot device 10 to the terminal device 12, so that the user can operate the robot device 10 by using the terminal device 12.

The terminal device 12 is a smartphone, a personal computer (PC), a cellular phone, or a tablet PC, for example. The terminal device 12 stores data concerning a robot character existing in a virtual space, and the user can operate the robot character by using the terminal device 12. By using the robot character, authorization to operate the robot device 10 is transferred to the terminal device 12, which will be discussed later.

Using a robot character may implement so-called robotic process automation (RPA). That is, the robot character may function as a software robot to execute processing in a virtual space. The robot character may execute routine processing, such as data input and work that can be done by combining plural applications, data collection and analysis processing, and decision-making processing by conducting data-based learning. For example, a user provides an instruction to execute processing to a robot character, and then, the robot character executes processing in accordance with this instruction by using the terminal device 12 or the robot device 10.

The robot character may be endowed with artificial intelligence (AI). That is, a robot character (AI software robot) may be utilized. In this case, the robot character (AI) may have the capability to make decisions similar to those achieved by a human. Neural-network deep learning or reinforcement learning for partially reinforcing learning fields may be utilized. A genetic algorithm, cluster analysis, a self-organizing map, or ensemble learning may be utilized. An AI technology other than the above-described methods may be utilized. The robot character may not be necessarily endowed with M.

The robot character may execute processing in a virtual space, or may control the operation of another robot character in a virtual space (for example, instructing another robot character to execute processing). The robot character may alternatively control the robot device 10 or another device in a real space (for example, instructing the robot device 10 or another device to execute processing). The robot character executes various processing operations, such as image processing, audio processing, and statistical processing. Processing executed by the robot character may be conducted in the terminal device 12, the robot device 10, or another device. The robot character may implement the above-described RPA.

The individual devices included in the information processing system according to this exemplary embodiment will be discussed below in detail.

Figure 2:
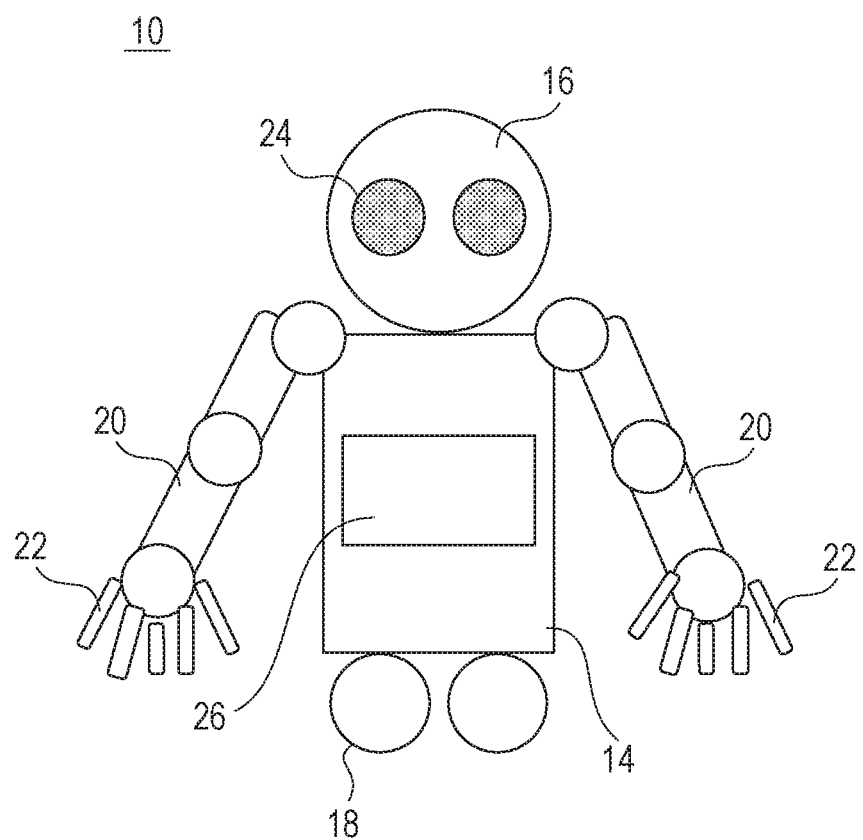
FIG. 2 illustrates the external appearance of a robot device according to the exemplary embodiment.

FIG. 2 illustrates the external appearance of the robot device 10. The robot device 10 is a humanoid robot, for example. The robot device 10 may alternatively be another type of robot. That is, any types of devices that execute predetermined operations or functions under certain conditions, such as video machines, audio machines, information devices, are called robot devices. More specific examples of robot devices are display devices, such as television sets, recording devices, such as recorders, playback devices, image capturing devices, such as video cameras, multifunction devices, PCs, smartphones, cellular phones, refrigerators, rice cookers, washing machines, microwaves, and air-conditioners. The robot device 10 is an example of an external device for the terminal device 12. In the example shown in FIG. 2, the robot device 10 has a torso part 14, a head part 16 provided above the torso part 14, a leg part 18 provided below the torso part 14, arm parts 20 provided on both sides of the torso part 14, and finger parts 22 provided at the tips of the arm parts 20.

The robot device 10 has at least one of a visual sensor, a hearing sensor, a touch sensor, a taste sensor, and an odor sensor, and thus has a function corresponding to at least one of the five senses of humans such as sight, hearing, touch, taste, and smell. Concerning the sense of touch, for example, the robot device 10 may have the capability to understand and distinguish superficial sensation (such as touch, pain, and temperature), deep sensation (such as pressure, position, and vibration), and cortical sensation (such as two-point perception and stereo perception) from each other. The robot device 10 may also have the sense of balance. A sensor, such as a camera 24, is provided in the head part 16 of the robot device 10. The sense of sight of the robot device 10 is achieved by recognizing images captured by the camera 24. A voice collector, such as a microphone, is provided in the robot device 10. The sense of hearing of the robot device 10 is achieved by recognizing voice obtained by the microphone.

The robot device 10 may include the function of detecting the brain waves of a human. For example, a brain wave detector is attached to a human, and the function provided in the robot device 10 receives brain wave information transmitted from the brain wave detector and analyzes the brain waves.

The leg part 18 corresponds to an example of a moving unit, and is driven by a driving force from a drive source, such as a motor. The robot device 10 is able to move by using the leg part 18. The leg part 18 may have the shape of human legs or may be a roller or a tire. The leg part 18 may have another shape. The leg part 18 is only an example of the moving unit. The robot device 10 may include another moving unit, for example, a component for flying such as a propeller, a wing, and an airplane engine, or a component for moving under the water, such as an underwater engine. That is, the robot device 10 may include, as the moving unit, at least one of a component for land moving, a component for flying, and a component for moving under the water. The robot device 10 may not necessarily include any moving unit.

The robot device 10 may have the capability to catch or carry an object by using the arm parts 20 and the finger parts 22. The robot device 10 may have the capability to move while catching or holding an object.

The robot device 10 may have the function of outputting sound. The robot device 10 may have a communication function to send and receive data with another device. The robot device 10 may send and receive information by connecting to the Internet, or may conduct a search by using the Internet, for example. The robot device 10 may have the capability to communicate with a human, another device, or another robot device by emitting sound or sending a communication message.

The robot device 10 may have the capability to make decisions similar to those achieved by a human through machine learning using AI. Neural-network deep learning or reinforcement learning for partially reinforcing learning fields may be utilized. A genetic algorithm, cluster analysis, a self-organizing map, or ensemble learning may be utilized. An AI technology other than the above-described methods may be utilized.

The robot device 10 may control the operation of another device by communicating with this device using the communication function. The robot device 10 may operate another device by using a remote controller or directly operate this device without using a remote controller. When directly operating another device, the robot device 10 manipulates an operation unit (such as a button or a panel) provided in this device. If the robot device 10 is unable to control the operation of another device by communicating with this device, it may operate the device by using a remote controller or may directly operate this device. By analyzing an image obtained by the visual sensor, for example, the robot device 10 may identify the operation unit of another device or a remote controller so as to operate this device or the remote controller.

The robot device 10 may include a display 26. On the display 26, various images and messages, and so on, are displayed. The robot device 10 may include a projector, and may project various images and messages on another object, such as a table or a wall.

Figure 3:
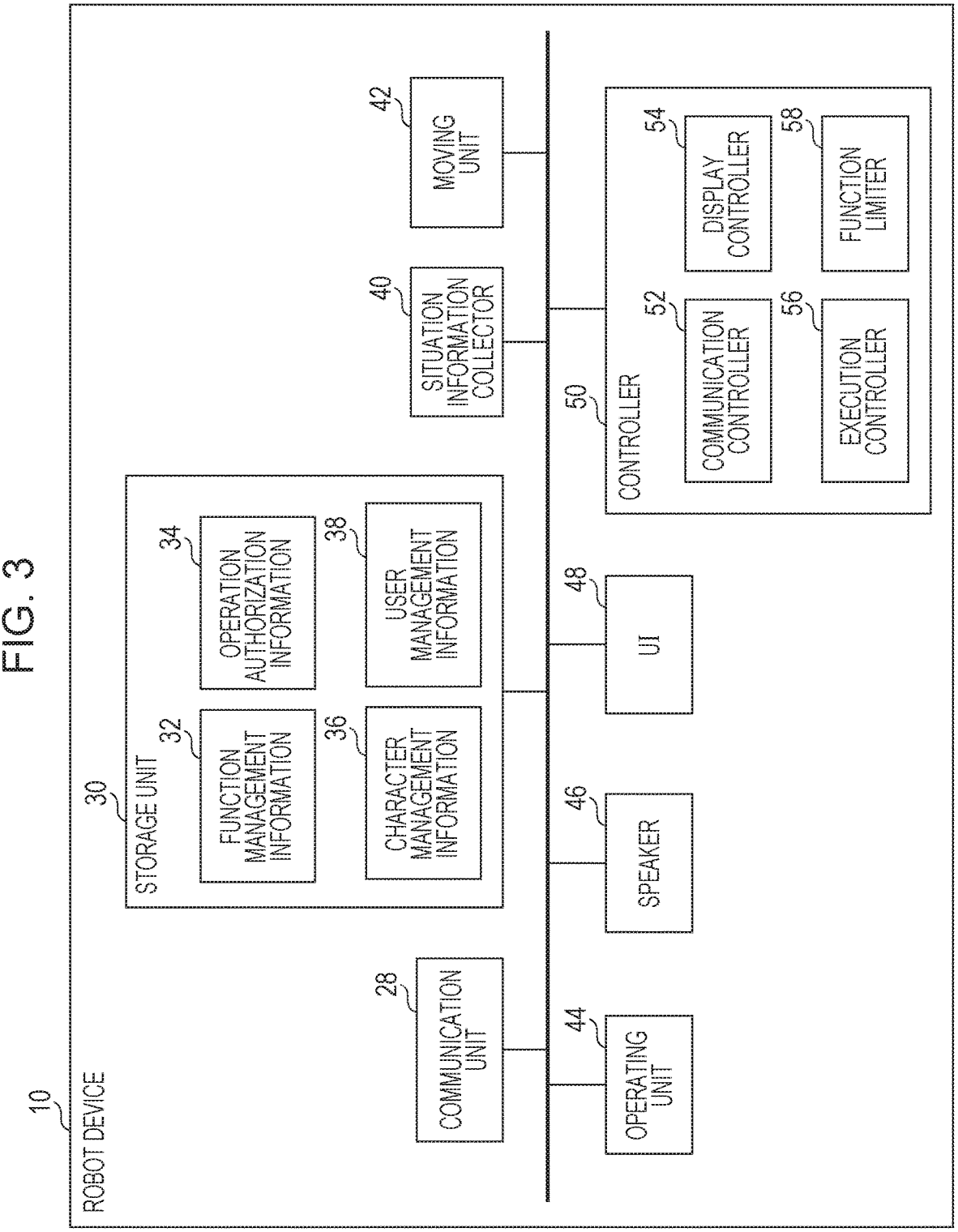
FIG. 3 is a block diagram of the robot device according to the exemplary embodiment.

The configuration of the robot device 10 will be described below in detail with reference to the block diagram of FIG. 3.

A communication unit 28, which is a communication interface, has the function of sending and receiving data to and from another device. The communication unit 28 may be a communication interface having a wireless communication function or a communication interface having a wired communication function. The communication unit 28 may support one or plural communication methods, and may communicate with a communication party in accordance with the communication method suitable for the communication party (that is, the communication method supported by the communication party). Examples of the communication methods are infrared communication, visible light communication, Wi-Fi (registered trademark) communication, near field communication (NFC) (such as Bluetooth (registered trademark)), and a radio frequency identifier (RFID). The communication unit 28 may switch the communication method in accordance with the communication party or the surrounding environments (the distance between the robot device 10 and the communication party or the presence or the absence of an obstacle between the robot device 10 and the communication party, for example). The frequency band used for communication may be a short waveband of 800 to 920 MHz, such as low power wide area (LPWA), or a long waveband of 2.4 GHz or 5 GHz (such as MuLTEfire). The communication unit 28 may switch the frequency band in accordance with the communication party or the communication method in accordance with the surrounding environments. The communication unit 28 corresponds to an example of a sender, a receiver, a character returning unit, and a character sender.

A storage unit 30 is a storage device, such as a hard disk or a memory (solid-state drive (SSD), for example). In the storage unit 30, function management information 32, operation authorization information 34, character management information 36, user management information 38, and other items of information, such as various items of data and various programs, are stored. Device address information indicating the addresses of other devices may also be stored in the storage unit 30. The above-described items of information may be stored in the same storage device or in different storage devices.

The function management information 32 is information for managing functions provided in the robot device 10. The function management information 32 indicates the association between the individual functions provided in the robot device 10 and individual operations (including processing and manipulation) executable by using these functions. Referring to the function management information 32 makes it possible to specify (identify) operations executable by the robot device 10.

As information concerning functions, device function management information and collaborative function management information may be stored in the storage unit 30. The device function management information is information for managing the functions of devices other than the robot device 10. The device function management information indicates the association between device identification information for identifying devices and function information indicating the functions provided in the devices. Examples of the device identification information are a device ID, a device name, a device type, a model number of a device, a position at which a device is installed (device position information), and an image representing the external appearance of a device. Examples of the function information are a function ID and a function name. If an image forming device, which is a device other than the robot device 10, has a scan function, a copy function, and a scan transfer function, function information indicating the scan function, function information indicating the copy function, and function information indicating the scan transfer function are associated with the device identification information for identifying the image forming device. Referring to the device function management information makes it possible to specify (identify) the functions of individual devices.

Examples of devices managed by the device function management information are those included in the information processing system. Devices which are not included in the information processing system may also be managed by the device function management information. The robot device 10 may obtain information (including device identification information and function information) concerning a new device which is not included in the information processing system and register the obtained information in the device function management information. Information concerning a new device may be obtained by using the Internet, for example, or as a result of an administrator, for example, inputting such information. The robot device 10 may update the device function management information regularly or at a certain timing or a timing specified by the administrator, for example. Because of this updating operation, function information concerning a new function which has not been provided in a device before the updating operation may be registered in the device function management information after the updating operation. In contrast, function information concerning a function which has been provided in a device before the updating operation may be deleted from the device function management information or may be registered as information indicating that this function is disabled. Updating information may be obtained by using the Internet, for example, or as a result of the administrator, for example, inputting such information.

The collaborative function management information is information for managing collaborative functions that are executable by combining plural functions. By combining plural functions, one or plural collaborative functions are executed. A collaborative function may be executed by combining plural functions of one device or by combining plural functions of plural devices. A device that provides an operation instruction (terminal device 12, for example) may be included in devices to be identified, and functions provided in such a device may be used as part of a collaborative function. Functions provided in the robot device 10 may also be used as part of a collaborative function.

A collaborative function may be a function that is executable without using a hardware device. For example, a collaborative function may be a function that is executable by combining plural software items. Alternatively, a collaborative function may be a function that is executable by combining a function of a hardware device and a function of software.

The collaborative function management information indicates the association between a combination of items of function information concerning functions to be combined for a collaborative function and collaborative function information indicating this collaborative function. The collaborative function information indicates a collaborative function ID and a collaborative function name, for example. When a function to be singly used is updated, the collaborative function management information is also updated accordingly. Because of this updating operation, a collaborative function that is not executable by combining certain plural functions before the updating operation may become executable after the updating operation. In contrast, a collaborative function that is executable by combining certain plural functions before the updating operation may become inexecutable after the updating operation. Collaborative function information indicating a collaborative function that has become executable after the updating operation may be registered in the collaborative function management information. Collaborative function information indicating a collaborative function that has become inexecutable after the updating operation may be deleted from the collaborative function management information or may be registered as information indicating that this collaborative function is disabled.

If plural devices are combined to execute a collaborative function, the collaborative function management information is information for managing collaborative functions that are executable by combining plural functions of plural devices. The collaborative function management information indicates the association between a combination of items of device identification information for identifying individual devices used for a collaborative function and collaborative function information indicating this collaborative function. When the device function management information is updated, the collaborative function management information is also updated accordingly. Because of this updating operation, a collaborative function that is not executable by combining certain plural functions of plural devices before the updating operation may become executable after the updating operation. In contrast, a collaborative function that is executable by combining certain plural functions of plural devices before the updating operation may become inexecutable after the updating operation.

A collaborative function may be a function executed by combining different functions or a function executed by combining the same functions of different devices. A collaborative function may be a function that is not executable unless different functions are combined or the same functions of different devices are combined. Such a collaborative function may be a function that is executable by combining different functions or a function that is executable by combining the same functions of different devices. For example, by combining a device (printer) having a print function and a device (scanner) having a scan function, a copy function is implemented as a collaborative function. That is, by combining a print function and a scan function, a copy function is implemented. In this case, a copy function as a collaborative function and a combination of a print function and a scan function are associated with each other. In the collaborative function management information, collaborative function information indicating a collaborative function, that is, a copy function, and a combination of device identification information for identifying a device having a print function and device identification information for identifying a device having a scan function are associated with each other.

The operation authorization information 34 is information indicating authorization to operate the robot device 10 (operation authorization). A user having operation authorization is authorized to operate the robot device 10. For example, by using a terminal device 12 which has received operation authorization, the user can instruct the robot device 10 to execute processing or another device to execute processing via the robot device 10. When data concerning a robot character in a virtual space is sent from the terminal device 12 to the robot device 10, the operation authorization information 34 is sent from the robot device 10 to the terminal device 12. Operation authorization is given to the user of the terminal device 12 in this manner. When a request to return a robot character is made in the terminal device 12, data concerning the robot character is sent (returned) from the robot device 10 to the terminal device 12. The user of the terminal device 12 loses authorization to operate the robot device 10 in this manner. Providing and canceling of operation authorization will be discussed later in detail. The use of a robot character facilitates the transferring and cancellation of operation authorization.

The character management information 36 is information for managing data concerning a robot character received from the terminal device 12. Data concerning a robot character is associated with user identification information for identifying a user related to the robot character (a user name or a user ID, for example) and terminal identification information for identifying a terminal device 12 which has sent data concerning the robot character (a device name or a device ID, for example). Data concerning a robot character sent from the terminal device 12 to the robot device 10 is stored in the storage unit 30, and the robot character is registered in the character management information 36. For example, the user identification information or the terminal identification information associated with data concerning a robot character is registered in the character management information 36. When a robot character is registered, the above-described operation authorization information 34 is sent to the terminal device 12 which has sent data concerning this robot character, and authorization to operate the robot device 10 is given to the user of the terminal device 12.

When a request to return a robot character is made in the terminal device 12, data concerning this robot character is sent (returned) from the robot device 10 to the terminal device 12, and this robot character is deleted from the character management information 36. The user of the terminal device 12 loses authorization to operate the robot device 10 in this manner. The robot device 10 accepts an instruction to execute processing from a terminal device 12 which has sent data concerning a robot character registered in the character management information 36. In contrast, the robot device 10 may not have to accept an instruction to execute processing from a terminal device 12 that stores data concerning a robot character which is not registered in the character management information 36. When the terminal device 12 having the operation authorization information 34 receives back data concerning a robot character from the robot device 10, the operation authorization information 34 may be erased in the terminal device 12. Alternatively, the operation authorization information 34 may be sent (returned) from the terminal device 12 to the robot device 10 and thus be erased from the terminal device 12. The storage unit 30 corresponds to an example of a storage unit of the robot device.

The user management information 38 is information for managing functions of the robot device 10 that are available to a user. The user management information 38 indicates the association for each user between user identification information and information concerning functions of the robot device 10 available to a corresponding user. When data concerning a robot character is sent from the terminal device 12 to the robot device 10, the robot device 10 can identify the user associated with this robot character by referring to the user identification information and also specify the functions available to this user by referring to the user management information 38. Functions available to the user are determined for each user in advance, and information concerning these functions is registered in the user management information 38. Each user may be able to use some or all of the functions of the robot device 10. Functions available to the user may be changed. The use of the user management information 38 makes it possible to set which functions will be available according to the user.

At least one of the function management information 32, the operation authorization information 34, the character management information 36, and the user management information 38 may be stored in a device other than the robot device 10 (such as a server, which is not shown, or the terminal device 12). In this case, such information stored in another device may not necessarily be stored in the storage unit 30 of the robot device 10.

A situation information collector 40 has the function of collecting information concerning situations around the robot device 10 by using various sensors. Hereinafter, such information will be called "situation information". Examples of such sensors are the above-described visual sensor, hearing sensor, touch sensor, taste sensor, and odor sensor. As the situation information, the situation information collector 40 collects data concerning sound (sound data including voice data) around the robot device 10 by using the hearing sensor. As the situation information, the situation information collector 40 also collects data concerning images (image data concerning video images and still images, for example) around the robot device 10 by using the visual sensor. Sensors other than the above-described sensors may also be used to collect information concerning the situations around the robot device 10.

The situation information collector 40 may collect situation information from devices and sensors other than the robot device 10. For example, the situation information collector 40 may collect sound data detected by a microphone, information concerning character strings, for example, input by using an input device such as a keyboard, and image data such as video images and still images captured by a camera.

A moving unit 42 has the function of moving the robot device 10 by using at least one of a component for land moving, a component for flying, and a component for moving under the water. In the example shown in FIG. 2, the moving unit 42 is constituted by the leg part 18. The robot device 10 may not necessarily include the moving unit 42.

An operating unit 44 has the functions of operating devices other than the robot device 10 and lifting and carrying objects. In the example shown in FIG. 2, the operating unit 44 is constituted by the arm parts 20 and the finger parts 22. The robot device 10 may not necessarily include the operating unit 44.

A speaker 46 has the function of outputting sound including voice.

A user interface (UI) 48 includes a display (display 26 shown in FIG. 2, for example) and an operation unit. The display is a display device, such as a liquid crystal display. The operation unit is an input device, such as a touch panel or a keyboard. The UI 48 may be a user interface serving as both of a display and an operation unit, such as a touch display and a device which displays a digital keyboard on a display. The robot device 10 may not necessarily include the UI 48, or may include only hardware keys, such as various buttons, without a display. Examples of buttons as hardware keys are buttons dedicated to the use of numeric input, such as a numeric keypad, and buttons dedicated to the use of indicating directions, such as direction indicator keys. The UI 48 corresponds to an example of an operation unit of the robot device. Even after authorization to operate the robot device 10 has been given to the user of a terminal device 12 as a result of the robot device 10 sending the operation authorization information 34 to the terminal device 12, the robot device 10 may still be operable by using the UI 48.

A controller 50 controls operations of the individual elements of the robot device 10. The controller 50 may be endowed with AI as an intelligence unit, for example, and the functions of the individual elements of the robot device 10 may be controlled by AI. The controller 50 includes a communication controller 52, a display controller 54, an execution controller 56, and a function limiter 58.

The communication controller 52 controls sending and receiving of information performed by the communication unit 28. For example, upon receiving data concerning a robot character from a terminal device 12 by the communication unit 28, the communication controller 52 causes the communication unit 28 to send the operation authorization information 34 to the terminal device 12. The operation authorization information 34 is then sent from the robot device 10 to the terminal device 12, so that the user can operate the robot device 10 by using the terminal device 12. If data concerning a robot character is sent from plural terminal devices 12 to the robot device 10, the communication controller 52 causes the communication unit 28 to send the operation authorization information 34 to each of the terminal devices 12.

Upon receiving by the communication unit 28 a request to return data concerning a robot character from a terminal device 12 which has sent this data, the communication controller 52 causes the communication unit 28 to send (return) this data to the terminal device 12. Then, the data concerning a robot character is sent (returned) from the robot device 10 to the terminal device 12. As a result, the terminal device 12 loses authorization to operate the robot device 10.

The display controller 54 has the function of performing control so that various items of information will be displayed on the display of the UI 48 or a display device other than the robot device 10. For example, upon receiving data concerning a robot character from a terminal device 12 by the communication unit 28, the display controller 54 performs control so that the image of this robot character will be displayed on the display of the UI 48. This enables a user to judge whether data concerning a robot character has been transferred to the robot device 10 or whether operation authorization has been given to the user. If data concerning a robot character is sent from plural terminal devices 12 to the robot device 10, the display controller 54 may perform control so that the images of the robot characters will be simultaneously displayed on the display of the UI 48 side by side or they will be sequentially displayed on the display of the UI 48 in chronological order in which the items of data have been received or according to the priority levels determined for the users. The display controller 54 corresponds to an example of a character display controller of the robot device.

When the communication unit 28 sends (returns) data concerning a robot character to a terminal device 12, the display controller 54 stops displaying the image of this robot character.

The execution controller 56 has the function of performing control so that the robot device 10 will execute certain processing. An instruction to execute processing may be provided from a terminal device 12 having operation authorization directly to the robot device 10 or may first be provided to a robot character stored in the robot device 10 and then to the robot device 10 via this robot character. If an instruction to execute processing is provided directly to the robot device 10, information concerning this instruction is sent from a terminal device 12 having operation authorization to the robot device 10, and the execution controller 56 then receives this information via the communication unit 28 and controls the operation of the robot device 10 in accordance with this instruction. If an instruction to execute processing is provided to the robot device 10 via a robot character, information concerning this instruction is sent from a terminal device 12 having operation authorization to the robot device 10. Then, a robot character stored in the robot device 10 first receives this information and then controls the operation of the robot device 10 in accordance with the instruction or causes the execution controller 56 to control the operation of the robot device 10. If a robot character is endowed with AI, AI may perform the above-described control operation.

An instruction to execute processing may be provided to the robot device 10 via the UI 48. Even after operation authorization has been given to the user of a terminal device 12 as a result of the robot device 10 sending the operation authorization information 34 to the terminal device 12, the robot device 10 may still be operable by using the UI 48.

The function limiter 58 has the function of limiting the functions of the robot device 10 available to a user (terminal device 12). The function limiter 58 refers to the user management information 38, for example, to specify the functions related to the user of a terminal device 12 which has sent data concerning a robot character to the robot device 10 and to limit the functions available to this user to these specified functions. The function limiter 58 may not necessarily be caused to function, in which case, the functions of the robot device 10 available to a user are not limited.

If the robot device 10 stores plural robot characters as a result of plural terminal devices 12 each sending data concerning a robot character to the robot device 10, that is, if the robot device 10 stores data concerning plural robot characters, the function limiter 58 may limit the available functions of the robot device 10 according to the user (according to the terminal device 12). In this case, the function limiter 58 may limit the available functions according to the user by referring to the user management information 38 and by specifying the available functions according to the user. Limiting the available functions according to the user can reduce the load on the robot device 10. The function limiter 58 may change the available functions according to the user. This may avoid a situation where the same function will be used by plural users, thereby enhancing the processing efficiency.

At least one of the communication controller 52, the display controller 54, the execution controller 56, and the function limiter 58 may be provided in a device other than the robot device 10 (such as a server, which is not shown, or the terminal device 12). In this case, such an element stored in another device may not necessarily be provided in the robot device 10.

Figure 4:
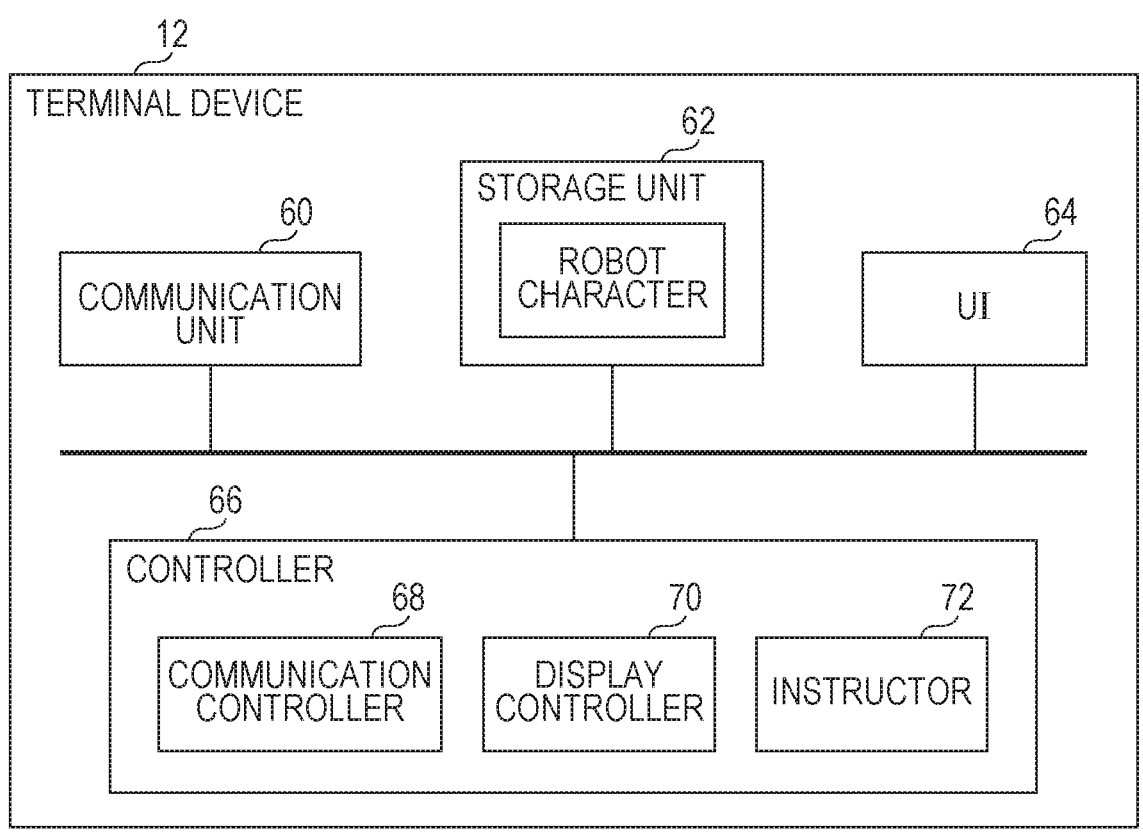
FIG. 4 is a block diagram of a terminal device according to the exemplary embodiment.

The configuration of the terminal device 12 will be described below in detail with reference to the block diagram of FIG. 4.

A communication unit 60, which is a communication interface, has the function of sending and receiving data to and from another device. The communication unit 60 may be a communication interface having a wireless communication function or a communication interface having a wired communication function. The communication unit 60 corresponds to an example of a sender, a receiver, and a returning character receiver of the information processing apparatus.

A storage unit 62 is a storage device, such as a hard disk or a memory (SSD, for example). In the storage unit 62, data concerning a robot character and other items of information, such as various programs and various items of data, are stored.

As described above, data concerning a robot character is associated with user identification information for identifying a user related to this robot character. Data concerning a robot character may be associated with terminal identification information for identifying a terminal device 12 storing this data. The function of a robot character may be determined according to the user. For example, processing executable by a robot character may differ according to the user. The storage unit 62 corresponds to an example of a storage unit of the information processing apparatus.

A UI 64 includes a display and an operation unit. The display is a display device, such as a liquid crystal display. The operation unit is an input device, such as a touch panel, a keyboard, and a mouse. The UI 64 may be a user interface serving as both of a display and an operation unit, such as a touch display and a device which displays a digital keyboard on a display.

A controller 66 has the function of controlling the operations of the individual elements of the terminal device 12. The controller 66 includes a communication controller 68, a display controller 70, and an instructor 72.

The communication controller 68 controls sending and receiving of information performed by the communication unit 60. For example, the communication controller 68 causes the communication unit 60 to send data concerning a robot character to the robot device 10 and to return the operation authorization information 34 to the robot device 10 so as to receive back data concerning the robot character from the robot device 10. When a user performs a sending operation for sending a robot character, the communication controller 68 causes the communication unit 60 to send data concerning the robot character to the robot device 10 in accordance with this sending operation.

The display controller 70 has the function of performing control so that various items of information will be displayed on the display of the UI 64. If a robot character is stored in the terminal device 12, that is, if data concerning a robot character is stored in the storage unit 62 of the terminal device 12, the display controller 70 performs control so that the image of the robot character will be displayed on the display of the UI 64. When the communication unit 60 has sent data concerning the robot character to the robot device 10, the display controller 70 may stop displaying the image of this robot character, that is, it may erase the image from the display of the UI 64. Alternatively, when the communication unit 60 has received the operation authorization information 34 from the robot device 10, the display controller 70 may stop displaying the image of this robot character. The communication controller 68 may perform control so that, when the image of a robot character is displayed on the display of the UI 64, data concerning this robot character will be sent to the robot device 10.

The display controller 70 performs control so that, when the communication unit 60 has received the operation authorization information 34 from the robot device 10, information concerning the available functions of the robot device 10 (a list of the available functions or a list of the executable processing operations of the robot device 10) will be displayed on the display of the UI 64. If the available functions are determined according to the user, the display controller 70 performs control so that information concerning the functions of the robot device 10 available to the user related to the robot character of the terminal device 12 will be displayed on the display of the UI 64. The display controller 70 corresponds to an example of a character display controller and a function display controller of the information processing apparatus.

The instructor 72 has the function of providing an instruction to execute processing to the robot device 10. For example, when authorization to operate the robot device 10 has been given to the user of the terminal device 12 as a result of the robot device 10 sending the operation authorization information 34 to the terminal device 12, the instructor 72 becomes able to provide an instruction to the robot device 10. The instructor 72 sends information indicating an instruction to execute processing specified by a user having operation authorization to the robot device 10 via the communication unit 60. For example, a list of processing operations executable by using the robot device 10 is displayed on the display of the UI 64, and the user selects and specifies processing from this list and provides an instruction to execute this processing. Then, the instructor 72 sends information indicating this instruction to the robot device 10. The instructor 72 may provide information indicating an instruction to execute processing directly to the robot device 10 or to a robot character sent to and stored in the robot device 10.

For example, information indicating an instruction to execute processing includes confirmation information indicating that the terminal device 12 has operation authorization. If the confirmation information is included in the execution instruction information, the controller 50 of the robot device 10 determines that the terminal device 12 is an authorized device with operation authorization. If the confirmation information is not included, the controller 50 determines that the terminal device 12 is not an authorized device and does not have operation authorization. Alternatively, the execution instruction information may include user identification information or terminal identification information. If the robot character associated with the user identification information or the terminal identification information is registered in the robot device 10, the controller 50 of the robot device 10 may determine that the terminal device 12 is an authorized device with operation authorization. If such a robot character is not registered in the robot device 10, the controller 50 may determine that the terminal device 12 is not an authorized device and does not have operation authorization.

Wireless communication technologies will be discussed below with reference to FIGS. 5 and 6. FIG. 5 illustrates the characteristics (advantages and disadvantages) of wireless communication technologies according to the frequency. FIG. 6 illustrates the characteristics of wireless communication technologies according to the communication method.

As shown in FIG. 5, one of the major standards of wireless communication technologies using a frequency of 900 MHz is RFID. Some of the advantages of RFID are having high resistance to obstacles and having few interference frequency bands such as that of microwave ovens. Some of the disadvantages of RFID are a large-size antenna and a short coverage range.

Some of the major standards of wireless communication technologies using a frequency of 2.4 GHz are ZigBee (registered trademark) and Bluetooth. Some of the advantages of such a communication technology are high power saving, high speed, and a small-size antenna, while one of the disadvantages is having many interference frequency bands.

Some of the major standards of wireless communication technologies using a frequency of 5 GHz are IEEE802.11a and MuLTEfire. Some of the advantages of such a communication technology are having few interference frequency bands and high speed, while one of the disadvantages is having low resistance to obstacles.

As shown in FIG. 6, some of the advantages of infrared communication are high power saving and easy miniaturization of devices, while one of the disadvantages is that infrared light is invisible.

One of the advantages of visible light communication is easy visible tracking of a communication path, while one of the disadvantages is its strong directivity.

One of the advantages of NFC is easy pairing between multiple devices, while one of the disadvantages is that communication is limited to near distances.

When performing communication with a communication party by using a wireless communication technology, the communication unit 28 of the robot device 10 communicates with the communication party by using a wireless communication technology having characteristics suitable for the surrounding environments and the communication party. More particularly, the communication unit 28 communicates with a communication party by changing the wireless communication technology in accordance with the distance between the robot device 10 and the communication party, the presence or the absence of an obstacle therebetween, and the communication method supported by the communication party.

The functions of the robot device 10 will now be described below in detail with reference to FIG. 7. FIG. 7 shows an example of a function management table as the function management information 32.

In the example of the function management table shown in FIG. 7, the management number, information indicating a function provided in the robot device 10, and information indicating an operation (including processing and manipulation) executable by using this function are associated with each other. For example, the robot device 10 has a lifting function of lifting an object by using the arm parts 20, and is able to lift and carry an object up to 30 kg by using this lifting function. The robot device 10 also has a moving function, and is movable by changing the speed within 10 km per hour by using this moving function.

The robot device 10 may have functions other than those shown in FIG. 7, for example, the function of executing processing, such as image processing, audio processing, and statistical processing.

The robot device 10 may execute a collaborative function by combining plural functions of the robot device 10. The robot device 10 may execute a collaborative function, working together with another device, by combining a function of the robot device 10 and a function of this device. The robot device 10 may cause another device to execute part of or the entirety of processing.

The robot device 10 may execute processing that a robot character has been instructed to execute, on behalf of this robot character, or may execute such processing together with the robot character.

Figure 8:
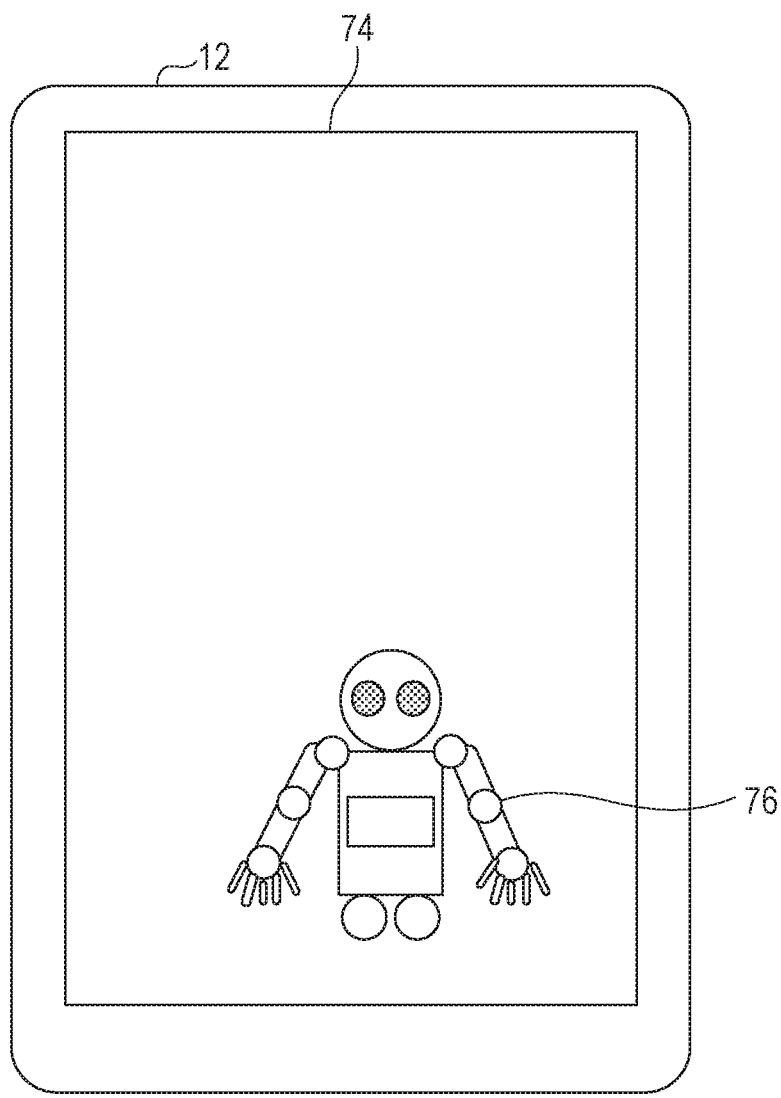
FIG. 8 illustrates a screen displayed on the terminal device.

A robot character displayed on the terminal device 12 will be discussed below with reference to FIG. 8. FIG. 8 illustrates an example of a screen displayed on the UI 64 of the terminal device 12.

A screen 74 is displayed on the display of the UI 64 of the terminal device 12. On the screen 74, a character image 76 associated with a robot character is displayed. If a robot character is stored in the terminal device 12, that is, if data concerning a robot character is stored in the storage unit 62 of the terminal device 12, the character image 76 is displayed on the screen 74 under the control of the display controller 70 of the terminal device 12. The display controller 70 may perform control so that, if the terminal device 12 has not received the operation authorization information 34 from the robot device 10, the character image 76 will be displayed on the screen 74. The character image 76 may be an image simulating the robot device 10 (an icon, for example), or an image showing the actual external appearance of the robot device 10 (an image generated as a result of capturing an image of the robot device 10, for example).

The robot character associated with the character image 76 is endowed with AI, and the user can provide an instruction to execute processing to this robot character by using the terminal device 12. The robot character executes processing in accordance with the instruction provided by the user, for example.

When the user performs a sending operation for sending the robot character associated with the character image 76 to the robot device 10 while the character image 76 is being displayed on the screen 74, the terminal device 12 sends data concerning this robot character to the robot device 10 in accordance with the sending operation. With this operation, the robot character is transferred from the terminal device 12 to the robot device 10. The display controller 70 of the terminal device 12 then stops displaying the character image 76 by erasing it from the screen 74. The display controller 70 may alternatively stop displaying the character image 76 when the terminal device 12 has received the operation authorization information 34 from the robot device 10. In this manner, data concerning a robot character is sent to the robot device 10 in accordance with a sending operation performed by the user. Thus, the robot character is not sent to the robot device 10 unless the user intends to do so.

The user may be able to perform a sending operation for sending a robot character only when the character image 76 is displayed on the screen 74. The user may be unable to perform a sending operation when the character image 76 is not displayed on the screen 74. The user then understands whether the user can send the robot character to the robot device 10 by checking whether the character image 76 is displayed on the screen 74.

When data concerning a robot character is sent from the terminal device 12 to the robot device 10, the data may be completely transferred to the robot device 10 and be erased from the storage unit 62 of the terminal device 12. In this case, the robot character no longer exists in the terminal device 12 as a result of being transferred to the robot device 10.

Alternatively, when data concerning a robot character has been sent from the terminal device 12 to the robot device 10, it may still remain in the storage unit 62 of the terminal device 12, and sending record information indicating that data concerning a robot character has been sent to the robot device 10 may be stored in the storage unit 62 of the terminal device 12. In this case, although the robot character is transferred from the terminal device 12 to the robot device 10, it still exists in the terminal device 12. Alternatively, data concerning a robot character may not be sent to the robot device 10 and remain in the storage unit 62 of the terminal device 12, and instead, image data indicating the robot character may be sent to the robot device 10. Upon receiving the image data, the robot device 10 may send the operation authorization information 34 to the terminal device 12, assuming that the robot character has been transferred from the terminal device 12 to the robot device 10.

Data or image data indicating a robot character is sent and received by NFC, for example, by using such as FeliCa (registered trademark). In this case, as a result of the user bringing the terminal device 12 into contact with or close to the communication unit 28 of the robot device 10, communication is established between the terminal device 12 and the robot device 10, and data or image data indicating a robot character is sent from the terminal device 12 to the robot device 10. Data or image data indicating a robot character may be sent from the terminal device 12 to the robot device 10 by another approach, for example, by using wireless communication such as Wi-Fi.

Figure 9:
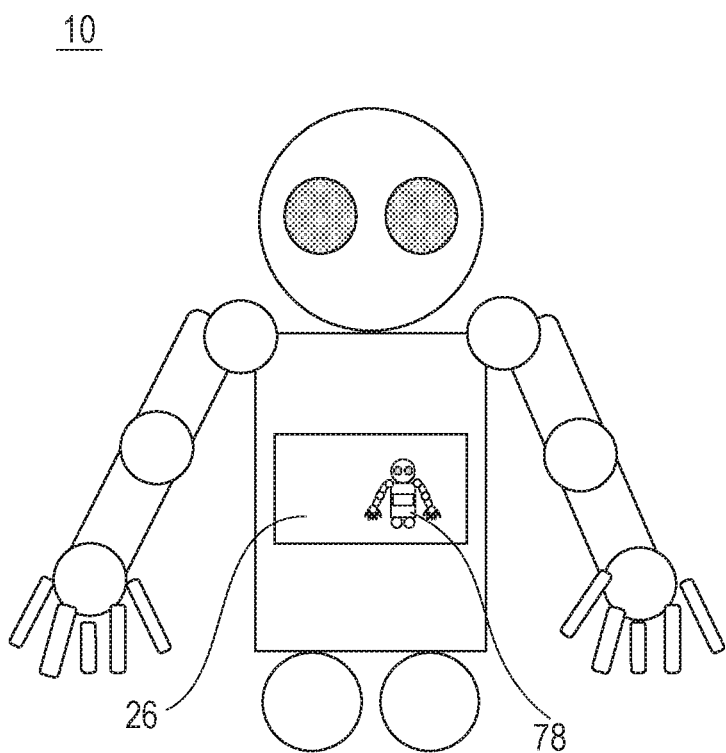
FIG. 9 illustrates the external appearance of the robot device.

When data or image data indicating a robot character has been sent from the terminal device 12 to the robot device 10, a character image is displayed on the display 26 of the robot device 10, such as that shown in FIG. 9. The display controller 54 of the robot device 10 performs control so that a character image 78 associated with the robot character will be displayed on the display 26. This enables a user to understand that the robot character related to the user has been transferred from the terminal device 12 to the robot device 10 and that authorization to operate the robot device 10 has been given to the user.

Data concerning a robot character sent from the terminal device 12 to the robot device 10 is registered in the character management information 36 of the robot device 10. The operation authorization information 34 is accordingly sent from the robot device 10 to the terminal device 12. The terminal device 12 receives the operation authorization information 34 and can thus operate the robot device 10. Operation authorization may be given to the robot character sent to the robot device 10. In this case, by using the terminal device 12, the user provides an instruction to execute processing to the robot character stored in the robot device 10. The robot character then receives information indicating this instruction from the terminal device 12 and executes processing within the robot terminal 10 in accordance with the instruction.

Information concerning the functions of the robot device 10 is sent from the robot device 10 to the terminal device 12, and is displayed on the display of the UI 64 of the terminal device 12. The user is then able to provide an instruction to execute processing to the robot device 10 by using the terminal device 12 in which the operation authorization information 34 is stored. Information indicating this instruction is sent from the terminal device 12 to the robot device 10 or a robot character, and the robot device 10 or the robot character executes processing in accordance with the instruction.

The robot character may be endowed with AI. Information concerning AI and the associated information may be sent from the robot character to the robot device 10, and the robot device 10 may conduct learning based on the received information.

The available functions of the robot device 10 may be limited according to the user, as discussed above.

As a result of the user bringing the terminal device 12 without a robot character into contact with or close to the communication unit 28 of the robot device 10, communication is established between the terminal device 12 and the robot device 10. Information indicating a request to return the robot character is sent from the terminal device 12 to the robot device 10, and data concerning this robot character is accordingly sent (returned) from the robot device 10 to the terminal device 12. For example, user identification information or terminal identification information is sent from the terminal device 12 to the robot device 10. The communication controller 52 of the robot device 10 extracts data concerning the robot character associated with this user identification information or terminal identification information from the storage unit 30, and sends the extracted data to the terminal device 12 via the communication unit 28. The robot character is returned from the robot device 10 to the terminal device 12 in this manner. In the robot device 10, data concerning the robot character is erased. The use of user identification information or terminal identification information enables the robot device 10 to distinguish the robot characters of individual users from each other. The user can thus receive back the robot character related to the user returned from the robot device 10 which stores plural robot characters. In return for the robot character, authorization to operate the robot device 10 is canceled in the terminal device 12. For example, in return for the robot character, the controller 66 of the terminal device 12 may erase the operation authorization information 34 from the terminal device 12. Alternatively, the robot device 10 may append a remove program to data concerning the robot character to be returned to the terminal device 12, and the terminal device 12 may execute the remove program upon receiving back the robot character so that the operation authorization information 34 can be erased. The terminal device 12 loses authorization to operate the robot device 10 in this manner. The terminal device 12 which has lost authorization is unable to operate the robot device 10. For example, the robot device 10 may not have to accept an instruction to execute processing from a terminal device 12 which does not have operation authorization, or even if it accepts this instruction, it may not have to execute processing in accordance with this instruction.

If data concerning a robot character is not erased from a terminal device 12 after it has been sent to the robot device 10, authorization to operate the robot device 10 may be canceled in the terminal device 12 in the following manner. As a result of the user bringing the terminal device 12 having operation authorization into contact with or close to the communication unit 28 of the robot device 10, communication is established between the terminal device 12 and the robot device 10, and operation authorization is accordingly canceled in the terminal device 12. For example, user identification information or terminal identification information is sent from the terminal device 12 to the robot device 10. If the robot character associated with this user identification information or terminal identification information is registered in the robot device 10, a command to delete the operation authorization information 34 is sent from the robot device 10 to the terminal device 12. The terminal device 12 accordingly executes this command to cancel operation authorization. In the robot device 10, data concerning the robot character is erased.

There may be a situation where the robot character associated with another user is already stored in the robot device 10. In this case, if sharing of the robot device 10 is permitted, another robot character may be transferred from a terminal device 12 to the robot device 10. Information concerning whether sharing of the robot device 10 is permitted is set in the robot device 10. For example, a robot character A associated with a user A is already stored in the robot device 10 and sharing of the robot device 10 is permitted. In this case, a user B brings its terminal device 12 into contact with or close to the communication unit 28 of the robot device 10, and then, data concerning a robot character B associated with the user B is sent from the terminal device 12 to the robot device 10. As a result, both of the robot characters A and B are stored in the robot device 10, and both of the user A and the user B have authorization to operate the robot device 10. If sharing of the robot device 10 is not permitted, the robot device 10 does not accept data concerning the robot character B associated with the user B. In this case, only the user A has authorization to operate the robot device 10.

If plural robot characters are stored in the robot device 10, they may serve as relay units that relay information to be sent and received between plural terminal devices 12 that have sent the robot characters to the robot device 10. More specifically, within the robot device 10, plural robot characters send and receive information with each other, and each robot character sends its own terminal device 12 (terminal device 12 which has sent this robot character to the robot device 10) information received from another robot character. The robot character sends such information by using a communication function of the robot device 10. Each user may also send information by using its own terminal device 12 to the robot character within the robot device 10 associated with the user, and this robot character may send this information to another robot character within the robot device 10. In this manner, information is sent and received between plural users. By sending and receiving information between plural robot characters, each robot character may also conduct learning. For example, information concerning AI may be sent and received between plural robot characters.

If plural robot characters are stored in the robot device 10, that is, if plural robot characters are registered as a result of data concerning plural robot characters being stored in the storage unit 30 of the robot device 10, the terminal device 12 may receive back a certain robot character from among the plural robot characters. For example, the display controller 54 of the robot device 10 performs control so that a list of images associated with the individual robot characters will be displayed on the display of the UI 48. The user then selects the image associated with a desired robot character from the list, and brings the terminal device 12 into contact with or close to the communication unit 28 of the robot device 10. Then, the communication controller 52 of the robot device 10 extracts data concerning the robot character associated with the image selected by the user from the storage unit 30, and sends the extracted data to the terminal device 12 via the communication unit 28. The terminal device 12 then receives the robot character selected by the user in this manner.

The user may acquire a robot character associated with another user stored in the robot device 10, and the robot device 10 may execute processing for transferring this robot character between the users. For example, the display controller 54 of the robot device 10 performs control so that a list of images associated with robot characters stored in the robot device 10 will be displayed on the display of the UI 48. The user then selects the image associated with a desired robot character from the list by using the UI 48 or the terminal device 12, and makes a request to transfer this robot character from the associated user. Then, the communication controller 52 of the robot device 10 sends information indicating this transfer request to the terminal device 12 associated with this robot character. The communication controller 52 sends this information by using, for example, wireless communication such as Wi-Fi. In this terminal device 12, the communication unit 60 receives the information indicating this transfer request from the robot device 10. Then, the display controller 70 performs control so that information indicating that a transfer request has been received will be displayed on the display of the UI 64. The user of this terminal device 12 inputs information indicating whether the user will accept this transfer request by using the terminal device 12. Then, this information is sent from the terminal device 12 to the robot device 10. If the user accepts the request to transfer the robot character, the communication controller 52 of the robot device 10 causes the communication unit 28 to send data concerning this robot character to the terminal device 12 of the user made the transfer request. The communication unit 28 sends this data by using, for example, wireless communication such as NFC or Wi-Fi. If the transfer request is accepted, the display controller 54 of the robot device 10 may perform control so that information indicating that the transfer request has been accepted will be displayed on the display of the UI 48 of the robot device 10. Alternatively, this information may be sent from the robot device 10 to the terminal device 12 of the user made the transfer request and be displayed on the display of the UI 64 of the terminal device 12. The user made the transfer request may then establish communication between the terminal device 12 and the robot device 10 by bringing the terminal device 12 into contact with or close to the communication unit 28 of the robot device 10. If the user received the transfer request does not accept the request, data concerning the robot character associated with this user is not sent to the terminal device 12 of the user made the request. The display controller 54 of the robot device 10 may then perform control so that information indicating that the transfer request has not been accepted will be displayed on the display of the UI 48 of the robot device 10 or on the display of the UI 64 of the terminal device 12 of the user made the request. The controller 66 corresponds to an example of an acquiring unit of the information processing apparatus.

The robot character may be used as a trigger for activating the robot device 10. When the robot device 10 is in the sleep state, hardware and software only for implementing the function of receiving data concerning a robot character are activated, and the other hardware and software are not activated. When data concerning a robot character is sent from a terminal device 12, the robot device 10 receives this data and activates the other hardware and software in accordance with the received data.

As described above, in this exemplary embodiment, by transferring a robot character in a virtual space from a terminal device 12 to the robot device 10, authorization to operate the robot terminal 10 is provided to the terminal device 12. It is thus possible to facilitate the transferring of operation authorization from the robot device 10 to the terminal device 12. By returning a robot character from the robot device 10 to the terminal device 12, authorization to operate the robot device 10 is canceled in the terminal device 12. It is thus possible to facilitate the cancellation of operation authorization in the terminal device 12. The terminal device 12 is also able to recover a robot character from the robot device 10 with a simple operation.

A modified example will be described below with reference to FIG. 10.

A robot character is endowed with AI, and AI is able to execute various processing operations, such as image processing, audio processing, and statistical processing. When a user performs a sending operation for sending a robot character, data representing the AI entity associated with the robot character is sent from the terminal device 12 to the robot device 10, as indicated by an arrow 80 in FIG. 10. Alternatively, data indicating an image associated with the robot character may be sent from the terminal device 12 to the robot device 10, and data representing the AI entity associated with the robot character may remain in the terminal device 12.

In the robot device 10, the AI entity transferred from the terminal device 12 controls the individual elements of the robot device 10 and causes it to execute certain processing. If the AI entity remains in the terminal device 12, the AI entity controls and causes the robot device 10 to execute certain processing by using the terminal device 12.

AI is capable of transferring between plural devices with permission of a user. For example, in a device endowed with logical AI, if AI is unable to execute certain processing in this device, that is, if the device does not have the function of executing this processing, or if the speed of this processing is lower than a predetermined threshold, or if the time taken to execute this processing is longer than a predetermined threshold, AI transfers to another device. In this case, data representing the AI entity may transfer to another device, or data indicating an image associated with a robot character may transfer to another device and data representing the AI entity may remain in the terminal device 12 or the device from which AI transfers to another device (such a device will be called a transfer source device). Wireless communication or wired communication is used for transferring AI between plural devices.

For example, AI is supposed to execute image processing, audio processing, and statistical processing in the robot device 10. If AI is unable to execute such processing in the robot device 10, or if the processing speed is lower than a predetermined threshold, or if the processing time is longer than a predetermined threshold, AI searches for another device that can execute such processing. The Internet may be used for conducting this search.

In the example shown in FIG. 10, a server 82 has the function of executing image processing, a server 84 has the function of executing audio processing, and a PC 86 has a display function. The order of operations to be executed is fixed. The operations are executed in the order of image processing, audio processing, and display processing. In this case, AI transfers from the robot device 10 to the server 82, as indicated by an arrow 88, and causes the server 82 to execute image processing, and then transfers from the server 82 to the server 84, as indicated by an arrow 90, and causes the server 84 to execute audio processing, and then transfers from the server 84 to the PC 86, as indicated by an arrow 92, and causes the PC 86 to display the processing result. In this case, too, data representing the AI entity may not necessarily transfer to another device (transfer destination device) but may remain in the terminal device 12 or a transfer source device, and the device having the AI entity may control and cause a transfer destination device to execute certain processing.

If the order of operations is not fixed, AI provided in a robot character may randomly transfer between plural devices and cause them to execute processing.

Each of the robot device 10 and the terminal device 12 may be implemented as a result of software and hardware operating together. More specifically, each of the robot device 10 and the terminal device 12 includes one or plural processors, such as a central processing unit (CPU), which is not shown. As a result of this processor or these processors reading and executing a program stored in a storage device, which is not shown, the functions of the robot device 10 and the terminal device 12 are implemented. This program is stored in a storage device by using a recording medium, such as a compact disc (CD) or a digital versatile disc (DVD), or via a communication path, such as a network. Alternatively, the functions of the robot device 10 and the terminal device 12 may be implemented by using hardware resources, such as a processor, an electronic circuit, and an application specific integrated circuit (ASIC). In this case, a device, such as a memory, may be used. Alternatively, the functions of the robot device 10 and the terminal device 12 may be implemented by using a digital signal processor (DSP) or a field programmable gate array (FPGA).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. A robot device comprising:
a processor configured to:
   receive, from an apparatus, a robot character;
   send an authorization to operate the robot device to the apparatus in return for the robot character; and
   cancel the authorization by returning the robot character to the apparatus.

2. The robot device according to claim 1, wherein the processor is further configured to send the authorization to the apparatus which has sent the robot character to the robot device.

3. The robot device according to claim 1, wherein the processor is further configured to:
control a display to display an image of the robot character when the robot character is received by the robot device.

4. The robot device according to claim 1, wherein the processor is further configured to:
operate the robot device after the processor has sent the authorization to the apparatus.

5. The robot device according to claim 1, wherein the processor is further configured to:
return the robot character to the apparatus which has sent the robot character if the apparatus requests the robot device to return the robot character.

6. The robot device according to claim 5, wherein, when the robot character is returned to the apparatus, the authorization in the apparatus is canceled.

7. The robot device according to claim 1, further comprising:
a memory that stores the robot character,
wherein the processor is further configured to limit, if the memory stores a plurality of robot characters including the robot character, a function available in the robot device for each of apparatuses, including the apparatus, which sent at least one of the robot characters respectively.

8. The robot device according to claim 1, further comprising:
a memory that stores the robot character,
wherein, if the memory stores a plurality of robot characters including the robot character, the plurality of robot characters instruct the processor to relay information to be sent and received between a plurality of apparatuses including the apparatus.

9. The robot device according to claim 1, wherein the processor is further configured to:
transfer, if the apparatus that has sent the robot character permits the robot character to be transferred to a different apparatus, the robot character to the different apparatus.

10. The robot device according to claim 1, wherein a function which will be available in the robot device is determined for each of a plurality of users.

11. The robot device according to claim 1, wherein the robot character comprises artificial intelligence.

12. The robot device according to claim 1, wherein a function of the robot character is determined for each of a plurality of users.

13. The robot device according to claim 1, wherein the at least processor is further configured to:
accept an instruction to execute processing provided from the apparatus having the authorization; and
control execution of the processing in accordance with the instruction.

14. The robot device according to claim 1, wherein an instruction to execute the processing is provided from the apparatus having the authorization to the robot character which is stored in the robot device, and the robot character is configured to control the robot device in accordance with the instruction.

15. The robot device according to claim 1, wherein the robot character is configured to execute processing in the robot device or in the apparatus that has sent the robot character in accordance with an instruction from a user.

16. The robot device according to claim 1, wherein the robot character comprises information.

17. The robot device according to claim 16, wherein the at least one hardware processor is further configured to implement transferring the information of the robot character to another robot character,
wherein the another robot character is stored in the robot device.

18. The robot device according to claim 1, wherein the authorization is provided to the robot character.

19. A non-transitory computer readable medium storing a program causing a computer to execute a process, the process comprising:
receiving, from an apparatus, a robot character;
sending an authorization to operate the robot device in return for the robot character; and
canceling the authorization by returning the robot character to the apparatus.

20. The information processing apparatus according to claim 1,
wherein the robot character comprises a visual representation of the robot device and also identifies a user of the apparatus,
wherein the processor is further configured to, in response to the robot device determining that the user, identified by the robot character, is predetermined to be authorized in response to receiving the robot character, control a display of the robot device to both display the robot character as a token representation of the robot device and control to send the authorization to the apparatus,
wherein the robot character further comprises an artificial intelligence of the robot device, and
wherein the robot device is configured to remain in a sleep state, in which a plurality of its functions, other than functions which check for receipt of the robot character, are disabled, until the receiver receives the robot character.

* * * * *